United States Patent
Wong et al.

(10) Patent No.: US 12,314,215 B1
(45) Date of Patent: May 27, 2025

(54) DIGITAL SIGNAL PROCESSOR (DSP) WITH GLOBAL AND LOCAL INTERCONNECT ARCHITECTURE AND RECONFIGURABLE HARDWARE ACCELERATOR CORE

(71) Applicant: Keysight Technologies, Inc., Santa Rosa, CA (US)

(72) Inventors: Hun Wey Wong, Balik Pulau (MY); Jia Huey Wong, Simpang Ampat (MY); Yuen Hang Ho, Sitiawan (MY)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/967,444

(22) Filed: Oct. 17, 2022

(51) Int. Cl.
   *G06F 13/36* (2006.01)
   *G06F 15/78* (2006.01)

(52) U.S. Cl.
   CPC .......... *G06F 15/7896* (2013.01); *G06F 13/36* (2013.01)

(58) Field of Classification Search
   CPC ....................................................... G06F 13/36
   See application file for complete search history.

(56) References Cited

U.S. PATENT DOCUMENTS

| | | | |
|---|---|---|---|
| 10,635,769 B1 * | 4/2020 | Skalicky | G06F 30/398 |
| 10,673,439 B1 * | 6/2020 | Ahmad | H03K 19/17736 |
| 2014/0119463 A1 * | 5/2014 | Masse | H03K 19/1737 375/259 |
| 2019/0303033 A1 * | 10/2019 | Noguera Serra | G06F 3/061 |
| 2019/0347125 A1 * | 11/2019 | Sankaran | G06F 9/30047 |
| 2020/0081850 A1 * | 3/2020 | Singh | G06F 13/1673 |

OTHER PUBLICATIONS

Wu et al., "Copy Propagation Optimizations for VLIW DSP Processors with Distributed Register Files," Languages and Compilers for Parallel Computing, pp. 1-16 (2007).
Tewksbury et al., "A Parallell DSP Testbed with a Heterogeneous and Reconfigurable Network Fabric," IEEE, pp. 310-322 (1997).
"AMBA 4 AXI4-Stream Protocol," ARM, Version: 1.0, pp. 1-42 (2010).
"AMBA AXI Protocol," ARM, V1.0, pp. 1-108 (2003).

* cited by examiner

*Primary Examiner* — Michael J Metzger

(57) ABSTRACT

A digital signal processor (DSP) with a global and local interconnection architecture includes a plurality of DSP hardware accelerator cores each including at least one DSP module for performing a DSP operation. The DSP further includes a global interconnect for data transfer between non-adjacent ones of the DSP hardware accelerator cores and between the DSP hardware accelerator cores and processing elements external to the DSP hardware accelerator cores. The DSP further includes a local stream interconnect associated with each of the DSP hardware accelerator cores for data transfer within each core and for data transfer between adjacent ones of the DSP hardware accelerator cores.

11 Claims, 4 Drawing Sheets

DIGITAL SIGNAL PROCESSOR (DSP) WITH GLOBAL AND LOCAL INTERCONNECT ARCHITECTURE AND RECONFIGURABLE HARDWARE ACCELERATOR CORE

TECHNICAL FIELD

The subject matter described herein relates to DSPs. More particularly, the subject matter described herein relates to a DSP with a global and local interconnect architecture and a reconfigurable hardware accelerator core.

BACKGROUND

Digital signal processing is a crucial component in many test and measurement devices. Digital signal processing plays an irreplaceable role in performing a wide variety of processing operations, such as multiplier-accumulator operations, spectrum analysis, filtering, etc. Traditionally, a specialized DSP processor is used to perform DSP operations. DSPs are used because a general-purpose central processing unit (CPU) or microcontroller lacks the technical specifications needed to perform DSP operations optimally. In some instances, a field programmable gate array (FPGA) can be used to implement specific DSP algorithms. However, as technological trends continue to move towards a more complex, data-rich environment, a new approach is needed that is superior in terms of performance and adaptiveness, as compared to a standalone DSP processor.

In some architectures, DSPs may include one or more hardware accelerator cores. One issue that arises in DSPs with hardware accelerator cores is providing efficiency in data transfers to, from, among, and within the DSP hardware accelerator cores. Another issue that arises is the need to provide flexibility in DSP operations that are implemented by one or more of the DSP hardware accelerator cores.

In light of these and other difficulties, there exists a need for a DSP with a global and local interconnect architecture and at least one user-configurable hardware accelerator core.

SUMMARY

A digital signal processor (DSP) with a global and local interconnection architecture includes a plurality of DSP hardware accelerator cores each including at least one DSP module for performing a DSP operation. The DSP further includes a global interconnect for data transfer between non-adjacent ones of the DSP hardware accelerator cores and between the DSP hardware accelerator cores and processing elements external to the DSP hardware accelerator cores. The DSP further includes a local stream interconnect located within each of the DSP hardware accelerator cores for data transfer within each of the DSP hardware accelerator cores and for data transfer between adjacent ones of the DSP hardware accelerator cores. The DSP hardware accelerator cores communicate with the adjacent DSP hardware accelerator cores exclusively through their respective local stream interconnects and with the non-adjacent DSP hardware accelerator cores exclusively through the global interconnect.

According to another aspect of the subject matter described herein, at least one of the DSP hardware accelerator cores includes a user-configurable DSP sandbox for performing a user-programmable DSP function.

According to another aspect of the subject matter described herein, the global interconnect provides memory-mapped data transfers into each of the DSP hardware accelerator cores and from each of the DSP hardware accelerator cores.

According to another aspect of the subject matter described herein, the local stream interconnect provides point-to-point, non-memory-mapped data transfers within the DSP hardware accelerator cores and between the adjacent ones of the DSP hardware accelerator cores.

According to another aspect of the subject matter described herein, the global interconnect comprises an AXI protocol interconnect.

According to another aspect of the subject matter described herein, the local stream interconnect comprises an AXI-stream protocol interconnect.

According to another aspect of the subject matter described herein, the AXI-stream protocol interconnect comprises an AXI-stream inbound switch located within one of the DSP hardware accelerator cores for switching data into the one DSP hardware accelerator core and an AXI-stream outbound switch located within the one DSP hardware accelerator core for switching data from the one DSP hardware accelerator core.

According to another aspect of the subject matter described herein, the AXI-stream outbound switch is configured to route data to a DSP inbound switch of an adjacent DSP hardware accelerator core and to a DSP inbound switch associated with the one DSP hardware accelerator core.

According to another aspect of the subject matter described herein, the DSP includes a microcontroller for controlling data transfers over the global interconnect and the local stream interconnect.

According to another aspect of the subject matter described herein, the microcontroller is configured to execute a first thread for invoking a first one of the DSP hardware accelerator cores to perform a first DSP processing operation and to concurrently execute a second thread for invoking a second one of the DSP hardware accelerator cores to perform a second DSP processing operation.

According to another aspect of the subject matter described herein, a method for communicating among DSP hardware accelerator cores is provided. The method includes providing a plurality of DSP hardware accelerator cores each including at least one DSP module for performing a DSP operation. The method further includes providing a memory for storing data to be processed by the DSP hardware accelerator cores and data that has been processed by the DSP hardware accelerator cores. The method further includes providing a global interconnect interconnecting the DSP hardware accelerator cores to each other and to a microcontroller. The method further includes providing a local stream interconnect located within each of the DSP hardware accelerator cores. The method further includes transferring data among the microcontroller, the memory and the DSP hardware accelerator cores using the global interconnect. The method further includes transferring data within the DSP hardware accelerator cores and between adjacent ones of the DSP hardware accelerator cores using the local stream interconnect. The DSP hardware accelerator cores communicate with the adjacent DSP hardware accelerator cores exclusively through their respective local stream interconnects and with the non-adjacent DSP hardware accelerator cores exclusively through the global interconnect According to another aspect of the subject matter described herein, providing the DSP hardware accelerator cores includes providing at least one of the DSP hardware accelerator cores with a user-configurable DSP sandbox for performing a user-programmable DSP function.

According to another aspect of the subject matter described herein, transferring the data between the microcontroller, the memory and the DSP hardware accelerator cores include using a memory-mapped data transfer protocol for transferring data into each of the DSP hardware accelerator cores and from each of the DSP hardware accelerator cores.

According to another aspect of the subject matter described herein, the memory-mapped data transfer protocol comprises an AXI protocol.

According to another aspect of the subject matter described herein, transferring the data within the DSP hardware accelerator cores includes using a point-to-point, non-memory-mapped data transfer protocol.

According to another aspect of the subject matter described herein, the non-memory mapped data transfer protocol comprises an AXI-stream protocol.

According to another aspect of the subject matter described herein, the global interconnect comprises an AXI protocol interconnect.

According to another aspect of the subject matter described herein, the local stream interconnect comprises an AXI-stream protocol interconnect.

According to another aspect of the subject matter described herein, the AXI-stream protocol interconnect comprises an AXI-stream inbound switch located within one of the DSP hardware accelerator cores for switching data into the one DSP hardware accelerator core and an AXI-stream outbound switch located within the one DSP hardware accelerator core for switching data from the one DSP hardware accelerator core.

According to another aspect of the subject matter described herein, the method for communicating data among the DSP hardware accelerator cores includes executing a first thread for invoking a first one of the DSP hardware accelerator cores to perform a first DSP processing operation and concurrently executing a second thread for invoking a second one of the DSP hardware accelerator cores to perform a second DSP processing operation.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
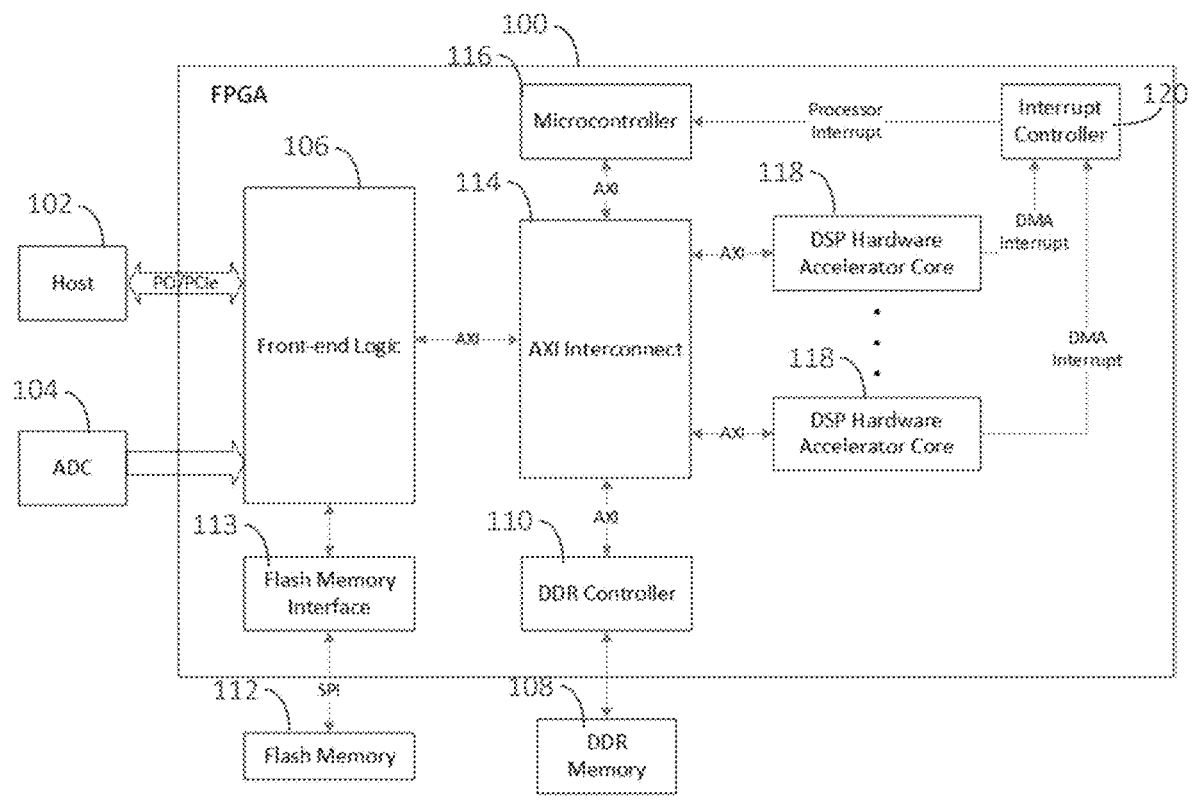
FIG. 1 is a block diagram illustrating an exemplary overall architecture for a digital signal processor including a global and local interconnect architecture and at least one reconfigurable hardware accelerator core.

The subject matter described herein includes a high-performance DSP computing platform that enables digital signal processing at a high data rate and addresses the limitations of existing DSP processor architectures or custom, FPGA-based DSP algorithms. The subject matter described herein includes a DSP having a global and local interconnect structure and a reconfigurable DSP in one or more of its DSP hardware accelerator cores, which provides a unique, integrated DSP processor architecture capable of high-performance.

As mentioned above, a standalone general-purpose CPU or microcontroller is not well-suited for performing digital signal processing related tasks and are generally not used in the industry for DSP computing. This is due to the following:

1. CPUs are mainly designed for general-purpose computational and input/output (I/O) handling tasks and thus lack the specialized hardware (such as a multiplier-accumulator) needed for DSP operations.
2. Many CPUs and microcontrollers are based on the Von Neumann or Harvard interconnect architectures, which limit the data transfer rate between the different modules within the CPU or microcontroller.

One existing method for performing specialized computing tasks is to use a specialized DSP processor which is implemented using a standalone integrated circuit. While this method is used in many applications, some limitations of this method are as follows:

1. Existing DSP processors provide limited hardware accelerator capabilities. Often, hardware accelerators provided in DSPs are only capable of performing certain generic algorithms, thus rendering the accelerators unusable to accelerate complex, customized DSP algorithms. An application specific integrated circuit (ASIC)-based DSP has no reconfiguration or adaptability to implement custom DSP intellectual property (IP) cores (referred to as DSP IPs).
2. Existing DSP processing architectures share a centralized interconnect architecture. For a bus-type interconnect, the centralized interconnect architecture can produce bottlenecks whenever multiple submodules require access to the interconnect, thus reducing data transfer rate.

For a crossbar-type interconnect, there is a limitation on the number of submodules that can be connected to the interconnect, because a large crossbar can be difficult to implement as it requires synchronizing large blocks of logic to meet timing requirements.

Alternatively, an FPGA-based DSP design is also available for implementing a custom DSP IP. Several FPGA vendors provide commonly used DSP IPs as well to implement parallel, hardware-based DSP processing. However, this method has several limitations, which include the fact that currently, the application of FPGA-based DSP solutions is limited to implementing custom DSP IPs without providing a complete DSP processing platform. This limits the breadth of functionality that can be performed by the DSP IPs. While providing custom DSP IPs is useful in performing specific DSP processing functions, custom DSP IPs alone are not capable of implementing a system-level DSP computing solution due to lack of a complete DSP processing infrastructure.

To address the aforementioned difficulties, the subject matter described herein includes a DSP with a global and local interconnect architecture and one or more DSP hardware accelerator cores with a user-configurable DSP module, referred to herein as the user-configurable DSP sandbox. The global and local interconnect architecture reduces latency of data transfers to, from, among, and within DSP processing cores. The user-configurable DSP sandbox enables users to configure the DSP to perform custom DSP operations.

In one example, the global interconnect architecture is implemented using the AXI protocol, and the local interconnect architecture is implemented using the AXI-stream protocol. The global interconnect architecture is implemented for data transfers between non-adjacent DSP hardware accelerator cores and between the DSP hardware accelerator cores and other processing elements external to the DSP hardware accelerator cores. The local interconnect architecture is used for data transfers between processing elements in the same processing core and between adjacent processing cores. An AXI interconnect is used for data transfers between DSP hardware accelerator cores and other processing elements, such as a microcontroller and between non-adjacent DSP processing cores. Using the AXI protocol and the AXI-stream protocol in this manner facilitates seamless integration and high-performance data transfer between the different processing blocks and computing cores. Higher data transfer rates can be achieved by increasing the width of the data bus, but increasing the width of the data bus may not be feasible without the integrated, single IC nature of the subject matter described herein.

FIG. 1 is a block diagram illustrating an exemplary digital signal processor with a global and local interconnect architecture and one or more DSP hardware accelerator cores with a user-configurable DSP module. Referring to FIG. 1, a DSP may be implemented using an FPGA, which will hereinafter be referred to as DSP FPGA 100. DSP FPGA 100 may communicate with a host 102 via any suitable bus architecture. In the illustrated example, DSP FPGA 100 is configured to communicate with host 102 via a PCI or PCIe bus. DSP FPGA 100 may also communicate with an analog to digital converter (ADC) 104. ADC 104 may provide digitized samples, such as measurements from sensors, to DSP FPGA 100, which may be configured to perform mathematical operations, such as adding, subtracting, multiplying, and/or dividing the data.

DSP FPGA 100 includes front end logic 106, which handles communications with host 102, receives sample data from ADC 104, pre-processes the sample data, and controls data flow between ADC 104 and double data rate (DDR) memory 108 via DDR controller 110. Front end logic 106 also handles communications with flash memory 112 via flash memory interface 113. Flash memory interface 113 and DDR controller 110 respectively provide data interfaces with flash memory 112 and DDR memory 108. DDR memory 108 provides volatile memory storage to temporarily store data before further processing or final data before the data is transferred back to host 102. Flash memory 112 is used to store FPGA configuration data, which can be rewritten by host 102. The ability to rewrite the FPGA configuration data improves the adaptiveness of the architecture as any part or the entire platform can be upgraded without a circuit board redesign.

In one existing architecture, the functionalities implemented by front end logic 106 are implemented in an FPGA separate from the DSP processor, which can lead to the disadvantages described above. According to an aspect of the subject matter described herein, the front end logic, which handles interfaces with the host, DSP hardware accelerator cores, DDR controller, and flash memory interface are integrated into the same FPGA.

An AXI interconnect 114 is also implemented on FPGA 100 and provides interconnection among front end logic 106, DDR controller 110, flash memory interface 113, microcontroller 116, and DSP hardware accelerator cores 118. Microcontroller 116 functions as a program flow and data flow controller. Microcontroller 116 receives decoded messages from host 102 via front-end logic 106 and synchronizes the required signal processing operations based on the decoded messages. For example, microcontroller 116 initiates and synchronizes data transfers from ADC 104 towards the required preprocessing logic in front-end logic 106 and receives (e.g., from the host) control data to be processed either by microcontroller 116 itself or one or more of DSP hardware accelerator cores 118. Microcontroller 116 also stores intermediate data in a memory, which in the illustrated example is a double data rate (DDR) memory 108 when necessary. Microcontroller 116 also communicates with host 102 once final processed data from DSP FPGA 100 is ready to initiate data transfer back to host 102. Microcontroller 116 is also capable of performing less complex, low bandwidth computational tasks to prevent an inefficient usage of DSP hardware logic. When one of DSP hardware accelerator cores 118 completes processing of data, the DSP hardware accelerator core 118 generates an interrupt to an interrupt controller 120, which generates an interrupt to microcontroller 116.

AXI interconnect 114 provides global interconnection among front end logic 106, DDR controller 110, microcontroller 116, and DSP hardware accelerator cores 118. However, as will be described in detail below, data transfers between adjacent DSP hardware accelerator cores 118 and between components within DSP hardware accelerator cores 118 do not use AXI interconnect 114 and instead use the AXI-stream protocol implemented by local switches on each DSP hardware accelerator core 118. The AXI protocol is described in the AMBA Protocol v1.0 Specification, ARM (2004), the disclosure of which is incorporated herein by reference in its entirety. According to the AXI protocol specification, AXI data transfers are burst based in which every transaction has address and control information on the address channel that describes the nature of the data to be transferred. The data is transferred between master and slave using a write data channel to the slave or a read data channel to the master. In write transactions, in which all the data flows from the master to the slave, the AXI protocol has an additional write response channel to allow the slave to signal to the master the completion of the write transaction.

The AXI-stream protocol is described in AMBA 4 AXI4-Stream Protocol Specification, Version 1.0 ARM (2010). The AXI-stream protocol allows connected components to send aligned and unaligned data transfers to each other across interfaces, which are referred to as AXI-stream interfaces. In one example, a transfer of data across an AXI-stream interface occurs after a TVALID, TREADY handshake. Thus, two adjacent DSP hardware accelerator cores that seek to communicate with each other using the AXI-stream protocol may conduct a TVALID and TREADY handshake and then exchange data using the AXI-stream protocol. Data transfers can occur in bytes, packets, or frames. It should be noted that unlike the AXI protocol, which is memory-mapped, requiring address information to be communicated, the AXI-stream protocol is point-to-point, non-memory mapped, and does not require address information to be communicated.

Figure 2A:
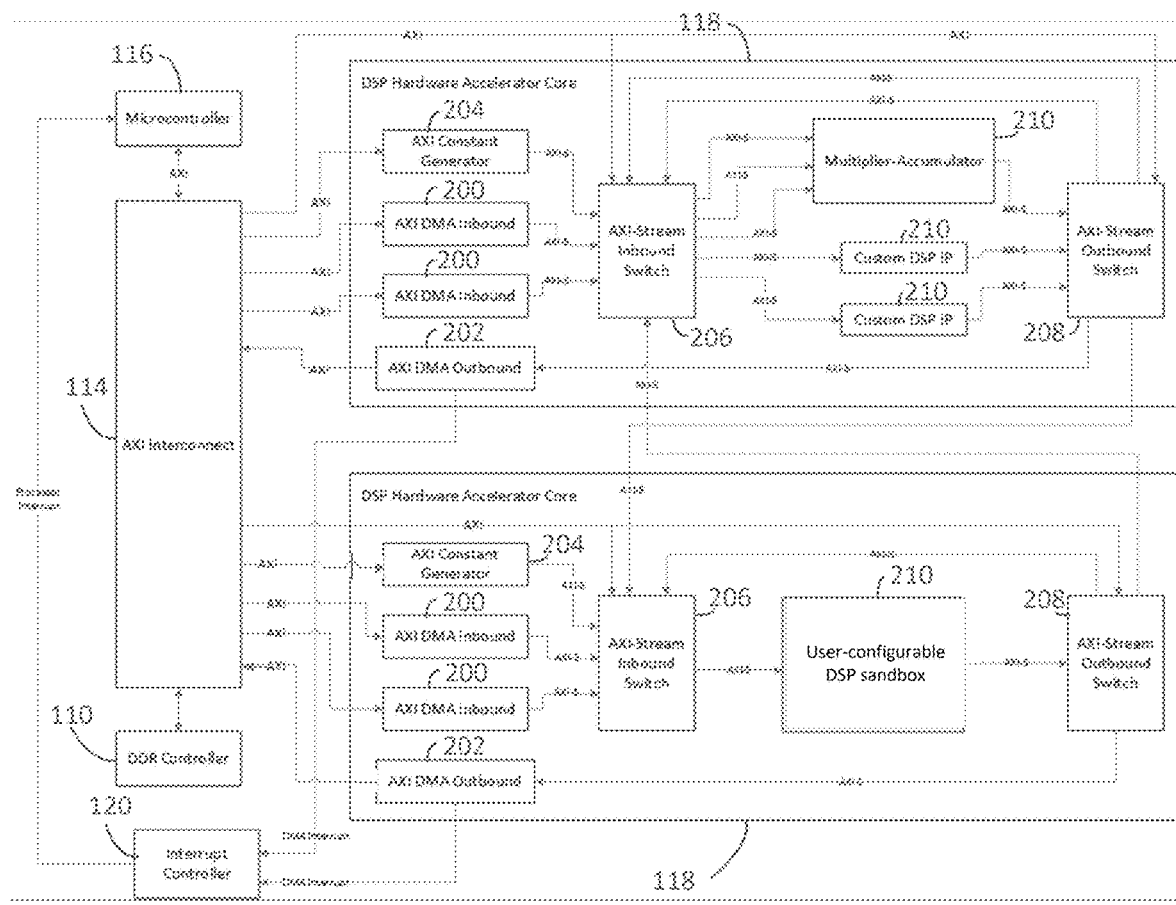
FIG. 2A is a block diagram illustrating an exemplary detailed architecture for DSP hardware accelerator cores including a global and local interconnect architecture and at least one reconfigurable hardware accelerator core.

Each DSP hardware accelerator core 118 provides specialized and reconfigurable DSP processing. FIG. 2A is a detailed block diagram of a DSP hardware accelerator core. In FIG. 2A, two DSP hardware accelerator cores 118 are shown for illustrative purposes. However, the actual number could be more depending on the size of DSP FPGA 100. Each core 118 is connected to AXI interconnect 114 via the AXI protocol. The data flow into and out of the core is handled by a set of AXI direct memory access (DMA) modules. In particular, each DSP hardware accelerator core 118 includes one or more AXI DMA inbound modules 200, which handle data transfer into the core, and one or more DMA outbound modules 202, which handle data transfer out of the core.

The operation of each DSP hardware accelerator core 118 begins when microcontroller 116 initiates one of AXI DMA inbound modules 200 to transfer input data into the core from DDR Memory 108. Additional constant input can be generated using an AXI constant generator 204.

To implement local interconnection between modules within each DSP hardware accelerator core 118 and between adjacent DSP hardware accelerator cores 118, each DSP hardware accelerator core 118 includes an AXI-stream inbound switch 206 and an AXI-stream outbound switch 208. Based on settings by microcontroller 116, each AXI-stream inbound switch 206 routes input data from one of AXI DMA inbound modules 200 and AXI constant generator 204 into one of DSP IPs 210 to perform the specific digital signal processing operations. For example, one of DSP IPs 210 may implement a multiplier-accumulator, which is a commonly used DSP function and is included in DSP FPGA 100 to provide a common IP for high reusability. Once the data is processed by the selected DSP IP 210, the output of the selected DSP IP 210 is channeled into AXI-stream outbound switch 208, which either routes the data back to the AXI-stream inbound switch 206 within the same core for further processing or routes the data to AXI DMA outbound module 202 so that the data can be transferred out of DSP hardware accelerator core 118.

Upon completion of the required digital signal processing operations, AXI DMA outbound module 202 sends a DMA interrupt to interrupt controller 120. In response to the DMA interrupt, interrupt controller 120 generates a processor interrupt to notify microcontroller 116 of completion of the required DSP processing operations. If processing by another DSP hardware accelerator core is required, AXI-stream outbound switch 208 of the core where the data currently resides will route the data to an AXI-stream inbound switch of an adjacent DSP hardware accelerator core 118. Data routing within each DSP hardware accelerator core and between adjacent cores may be performed using the AXI-stream protocol.

The data flow architecture in DSP hardware accelerator core 118 is based on the global/local interconnect concept. Data transfer between the core and other modules or between non-adjacent cores are done via the AXI interconnect using the AXI protocol. The AXI interconnect and the AXI protocol provide the global interconnect for data transfers within DSP FPGA 100. Locally, data transfers within core 118 and between adjacent cores 118 are done via AXI-stream inbound switch 206 and AXI-stream outbound switch 208. This brings about several benefits. Firstly, interconnect data bandwidth can be maximized. This is because while data transfer and processing are conducted locally either inside or between adjacent DSP hardware accelerator cores 118, on the global level, data transfer can still be conducted between other modules via AXI interconnect 114. This ensures any single DSP hardware accelerator core 118 does not block other modules or cores from performing data transfers. While the usage of a crossbar-based interconnect can reduce this issue as it is non-blocking in nature, there will theoretically still be latency due to interconnect arbitration, which increases with the size of the crossbar-based interconnect. Another drawback to having a single, integrated crossbar-based interconnect is that the larger the interconnect, the greater the difficulty in synthesizing and implementing the interconnect at production scale, which effectively places a theoretical performance limit based on the interconnect size. Interconnect size limits also affect the number of modules or cores that can be connected, thus reducing both the ability to perform parallel data processing and reduce the flexibility of having a more diverse set of reprogrammable cores. All these drawbacks are reduced by having separate global and local interconnects which effectively divides the different modules and the DSP hardware accelerator cores into the global interconnect (in this case the AXI interconnect) and the IP internal to the DSP hardware accelerator cores into the local interconnect (in this case the AXI-stream inbound switch and AXI-stream outbound switch).

In addition, the DSP hardware accelerator cores communicate with the adjacent DSP hardware accelerator cores exclusively through their respective local stream interconnects and with the non-adjacent DSP hardware accelerator cores exclusively through the global interconnect. Because the DSP hardware accelerator cores exclusively use the local interconnects for local communications with adjacent cores, such communications occur without blocking data transfers between the memory and the DSP hardware accelerator cores. In addition, locating the local stream interconnects within each DSP hardware accelerator cores is advantageous over DSPs with switching networks outside of the DSPs both from a component layout and a communications efficiency perspective, as each DSP hardware accelerator core can access its AXI-stream inbound and outbound switches without the access being blocked by another core or DSP. In addition to the multiplier-accumulator and other custom DSP IPs that may be pre-built on a DSP hardware accelerator core 118, one of DSP IPs 118 may be a user-configurable DSP sandbox to enable customer access to the DSP hardware accelerator core 118. A user-configurable DSP sandbox allows a user to reconfigure a portion of the DSP hardware accelerator core on-the-fly to implement a user-specific DSP application IP.

Figure 2B:
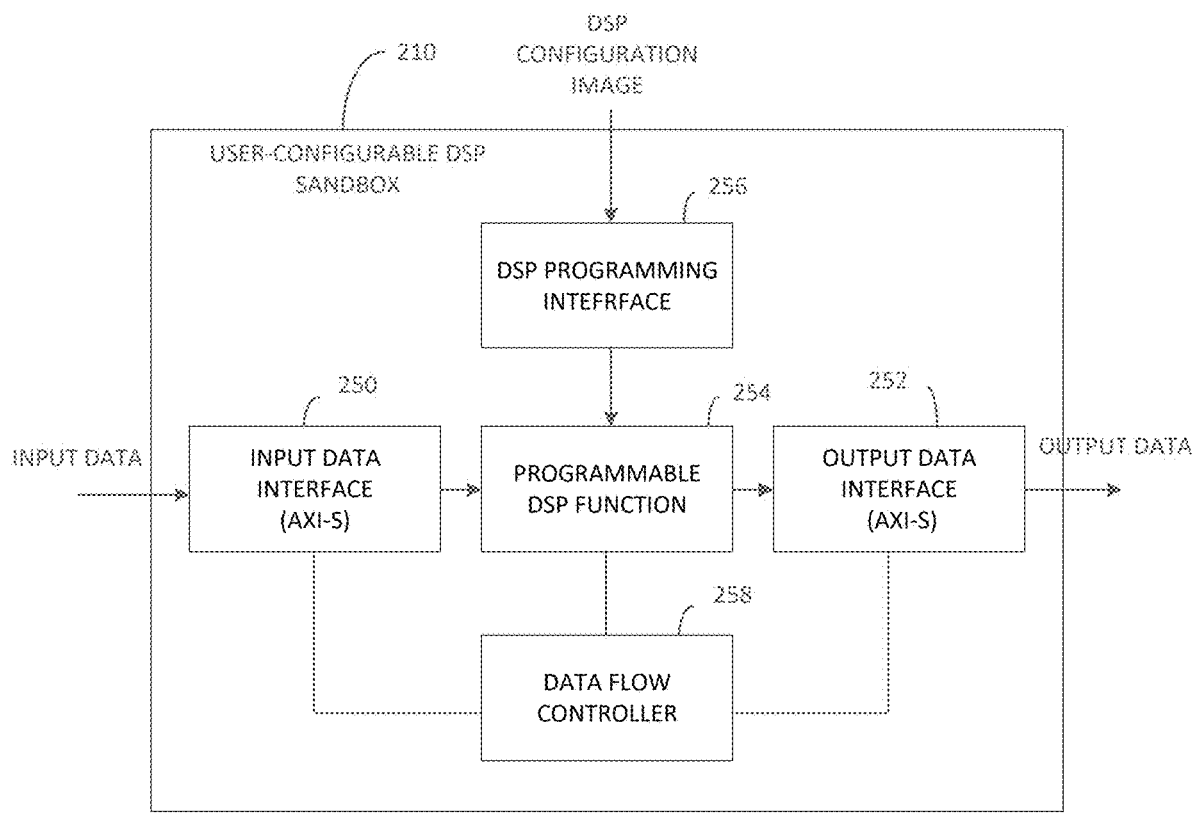
FIG. 2B is a block diagram illustrating an exemplary architecture for a user-configurable DSP sandbox.

A DSP-IP that includes user-configurable DSP sandbox is shown in FIG. 2B. Referring to FIG. 2B, a user-configurable DSP sandbox 210 allows a user to program a customized DSP algorithm at run-time while other parts of the system, such as host 102, are still running. In FIG. 2, user-configurable DSP sandbox 210 includes input and output data interfaces 250 and 252, which in the illustrated example are AXI-stream interfaces and which implement the AXI-stream protocol described above. User-configurable DSP sandbox 210 also includes a programmable DSP function 254 that is programmable via a programming interface 256. Programmable DSP function 254 may be programmed to perform a user-defined DSP function, such as quantizing, multiplying, etc., on the input data to produce the output data. Programming interface 256 may be any suitable interface for receiving DSP programming input. In one example, programming interface may receive DSP configuration images from the user that are created from compiled HDL, Python or C++ code and use the images to program DSP function 254. User configurable DSP sandbox 210 may also include a data flow controller 258 to manage the data flow from input data interface 250, through DSP function 254, and eventually to output data interface 252. One benefit of sandbox 210 is to provide the user with the ability to reconfigure the system at any time and program the DSP with a custom solution that is unique to the user's problem without intervention from the DSP manufacturer. Providing a user-configurable DSP sandbox also enables a user to protect a proprietary DSP algorithm as a trade secret.

Standardizing and localizing the interconnect architecture within the core allows for any user-specific IP to be seamlessly integrated without a compatibility issue. A localized interconnect architecture also allows a clearly defined region for implementing the user-configurable DSP sandbox without potentially negatively affecting the other portions of DSP FPGA 100. This feature enhances further the adaptiveness of the overall integrated DSP adaptive computing and hardware accelerator platform.

Figure 3:
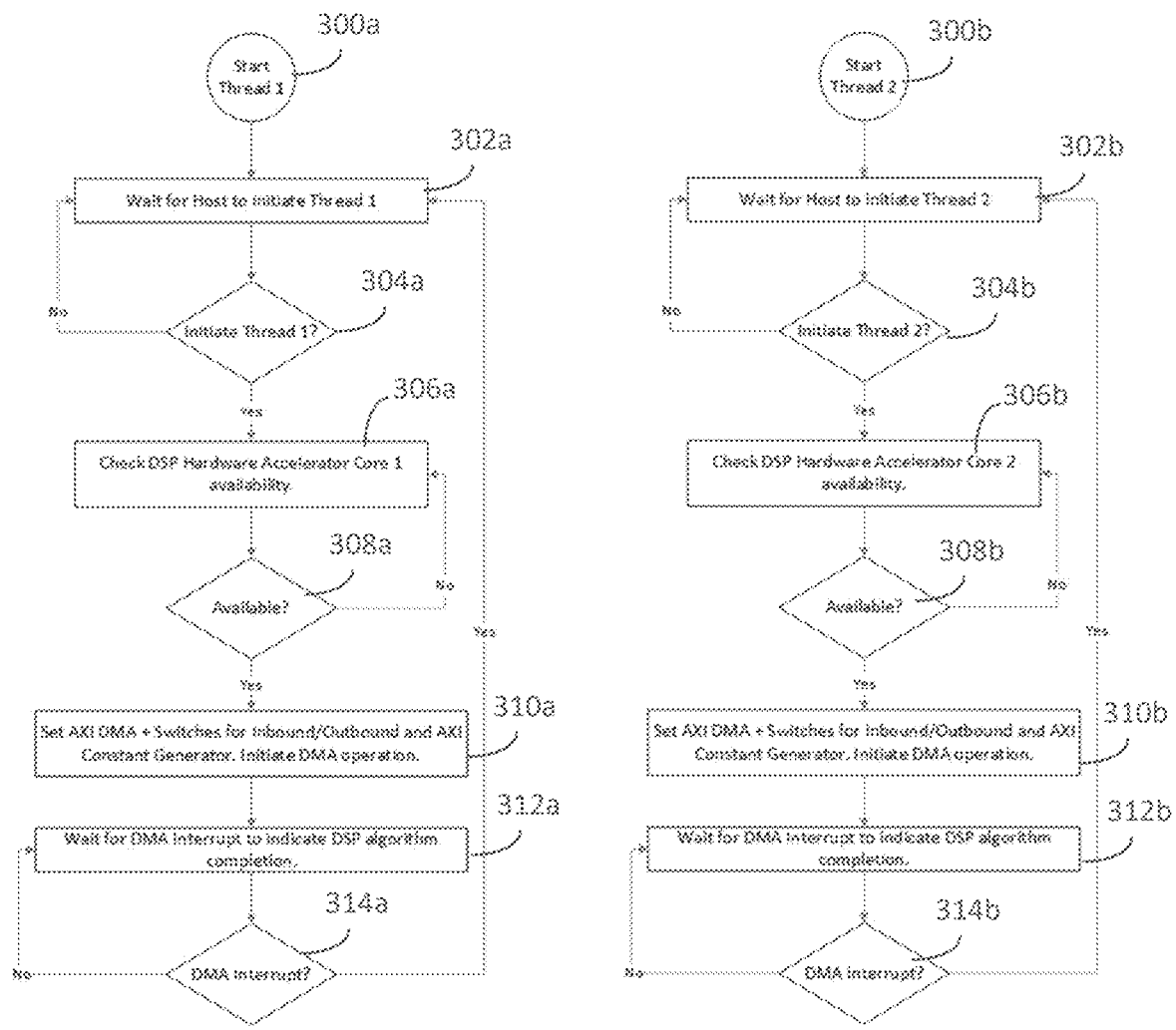
FIG. 3 is a flow chart illustrating concurrent execution of two threads by a microcontroller that accesses different DSP hardware accelerator cores to perform DSP processing tasks concurrently.

From a firmware perspective, the addition of multiple DSP hardware accelerator cores 118 allows parallel programming and takes advantage of the usage of a multi-core or multi-thread microcontroller. FIG. 3 shows an example program flow of two program threads. Referring to FIG. 3, the left and right-hand flow charts illustrate operations performed by two different threads executing on microcontroller 116. Referring to the operations of thread one in the left-hand flow chart, step 300a indicates the beginning of thread 1. In steps 302a and 304a, microcontroller 116 waits for the host to initiate thread 1. Once the host initiates thread 1, control proceeds to step 306a and 308a where thread 1 causes microcontroller 116 to check whether one of the DSP hardware accelerator cores, core 1, is available. If the DSP hardware accelerator core is available, control proceeds to step 310a where microcontroller 116 initializes AXI DMA modules 200, AXI-stream inbound switch 206, AXI-stream outbound switch 208, and AXI constant generator 204 and initiates the DMA operation to provide data that needs to be processed to DSP hardware accelerator core 118.

After setting the AXI DMAs and AXI switches in step 310a, the AXI-DMA inbound module 200 then reads out data from the DDR 108, transfers the data into the AXI-stream inbound switch 206, through the DSP IP 210 for DSP operations, to AXI stream outbound switch 208, then either to its associated or adjacent AXI-stream inbound switch 206 or to AXI DMA outbound module 202. If the data is transferred to AXI DMA outbound module 202, then the data goes back to DDR 108. Upon completion of transferring data from the AXI DMA outbound module 202 to DDR 108, interrupt controller 120 sends an interrupt to microcontroller 116 (steps 312a and 314a) After being interrupted, microcontroller 116 transitions from step 314a to 302a to wait for execution of the next thread to begin.

Microcontroller 116 executes steps 300b-314b in parallel with steps 300a-314a. Steps 300b-314b are the same as steps 300a-314a except that they involve invoking a different DSP hardware accelerator. Because DSP FPGA 100 includes multiple DSP hardware accelerator cores 118, different processing threads can invoke DSP tasks in parallel to concurrently perform DSP operations. Because of the global and local interconnect architecture, data transfers between adjacent DSPs and between processing modules within a DSP processing core will not block AXI interconnect data transfers between DSP hardware accelerator cores 118 and host 102.

Exemplary advantages of the subject matter described herein include a new architecture for high-speed DSP processing within a single FPGA IC to provide an integrated, adaptive DSP processing solution. The architecture incorporates a defined global-local interconnect structure to segregate data transfer between the various computing cores and submodules. The subject matter described herein also includes the implementation of DSP hardware accelerator cores that can be reconfigured. Within each DSP hardware accelerator core, multiple common and customized DSP IPs can be implemented and any combination of the DSP IPs within the core can be exercised at any specific time by controlling the data flow locally. The data flow of the DSP hardware accelerator core can be reconfigured on-the-fly to adapt to specific needs throughout the operation of the invention.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A digital signal processor (DSP) with a global and local interconnection architecture, the DSP comprising:
   a DSP field programmable gate array (FPGA);
   a plurality of DSP hardware accelerator cores implemented on the DSP FPGA, the DSP hardware accelerator cores each including at least one DSP module for performing a DSP operation, wherein at least one of the DSP hardware accelerator cores includes a programmable DSP function and a programming interface, wherein the programmable DSP function is programmable via the programming interface to perform a user-defined DSP function;
   a global interconnect implemented on the DSP FPGA and external to the DSP hardware accelerator cores for data transfer on the DSP FPGA between non-adjacent ones of the DSP hardware accelerator cores and between the DSP hardware accelerator cores and processing elements external to the DSP hardware accelerator cores, wherein the global interconnect implements a memory-mapped AXI protocol;
   a local stream interconnect implemented on the DSP FPGA and located within each of the DSP hardware accelerator cores for data transfer within each of the DSP hardware accelerator cores and for data transfer on the DSP FPGA between adjacent ones of the DSP hardware accelerator cores, wherein the local stream interconnect implements a non-memory-mapped AXI stream protocol, the DSP hardware accelerator cores communicate with the adjacent DSP hardware accelerator cores exclusively through their respective local stream interconnects using the non-memory-mapped AXI stream protocol and with the non-adjacent DSP hardware accelerator cores exclusively through the global interconnect using the memory-mapped AXI protocol;

each of the DSP hardware accelerator cores including an AXI direct memory access (DMA) outbound module, wherein, when digital signal processing performed by the DSP hardware accelerator cores has been completed, the AXI DMA outbound module of one of the DSP hardware accelerator cores generates a DMA interrupt;

a microcontroller implemented on the DSP FPGA for controlling data transfers over the global interconnect and the local stream interconnect; and an interrupt controller implemented on the DSP FPGA for generating an interrupt to the microcontroller in response to the DMA interrupt.

2. The DSP of claim 1 wherein the global interconnect provides memory-mapped data transfers into each of the DSP hardware accelerator cores and from each of the DSP hardware accelerator cores.

3. The DSP of claim 1 wherein the local stream interconnect provides point-to-point, non-memory-mapped data transfers within the DSP hardware accelerator cores and between the adjacent ones of the DSP hardware accelerator cores.

4. The DSP of claim 1 wherein the local interconnect comprises an AXI-stream inbound switch located within one of the DSP hardware accelerator cores for switching data into the one DSP hardware accelerator core and an AXI-stream outbound switch located within the one DSP hardware accelerator core for switching data from the one DSP hardware accelerator core.

5. The DSP of claim 4 wherein the AXI-stream outbound switch is configured to route data to a DSP inbound switch of an adjacent DSP hardware accelerator core and to a DSP inbound switch associated with the one DSP hardware accelerator core.

6. The DSP of claim 1 wherein the microcontroller is configured to execute a first thread for invoking a first one of the DSP hardware accelerator cores to perform a first DSP processing operation and to concurrently execute a second thread for invoking a second one of the DSP hardware accelerator cores to perform a second DSP processing operation.

7. A method for communicating among digital signal processor (DSP) hardware accelerator cores, the method comprising:

providing a DSP field programmable gate array (FPGA);

providing a plurality of DSP hardware accelerator cores implemented on the DSP FPGA each of the DSP hardware accelerator cores including at least one DSP module for performing a DSP operation, wherein at least one of the DSP hardware accelerator cores includes a programmable DSP function and a programming interface, wherein the programmable DSP function is programmable via the programming interface to perform a user-defined DSP function;

providing a global interconnect implemented on the DSP FPGA for interconnecting the DSP hardware accelerator cores to each other and to a microcontroller implemented on the DSP FPGA, wherein the global interconnect implements a memory-mapped AXI protocol;

providing a local stream interconnect implemented on the DSP FPGA and located within each of the DSP hardware accelerator cores, wherein the local stream interconnect implements a non-memory-mapped AXI stream protocol;

providing a memory implemented on the DSP FPGA for storing data to be processed by the DSP hardware accelerator cores and data that has been processed by the DSP hardware accelerator cores;

transferring data on the DSP FPGA among the microcontroller, the memory, and the DSP hardware accelerator cores using the global interconnect and the memory-mapped AXI protocol; and transferring data within the DSP hardware accelerator cores and on the DSP FPGA between adjacent ones of the DSP hardware accelerator cores using the local stream interconnect and the non-memory-mapped AXI stream protocol, wherein the DSP hardware accelerator cores communicate with the adjacent DSP hardware accelerator cores exclusively through their respective local stream interconnects using the non-memory-mapped AXI stream protocol and with the non-adjacent DSP hardware accelerator cores exclusively through the global interconnect using the memory-mapped AXI protocol;

each of the DSP hardware accelerator cores including an AXI direct memory access (DMA) outbound module, wherein, when digital signal processing performed by the DSP hardware accelerator cores has been completed, the method includes generating, by the AXI DMA outbound module of one of the DSP hardware accelerator cores, a DMA interrupt; and generating, using an interrupt controller implemented on the DSP FPGA, an interrupt to the microcontroller in response to the DMA interrupt.

8. The method of claim 7 wherein transferring the data among the microcontroller, the memory, and the DSP hardware accelerator cores includes using the memory-mapped AXI protocol for transferring data into each of the DSP hardware accelerator cores and from each of the DSP hardware accelerator cores.

9. The method of claim 7 wherein the non-memory-mapped AXI stream protocol comprises a point-to-point data transfer protocol.

10. The method of claim 7 wherein the local stream interconnect comprises an AXI-stream inbound switch located within one of the DSP hardware accelerator cores for switching data into the one DSP hardware accelerator core and an AXI-stream outbound switch located within the one DSP hardware accelerator core for switching data from the one DSP hardware accelerator core.

11. The method of claim 7 comprising executing a first thread for invoking a first one of the DSP hardware accelerator cores to perform a first DSP processing operation and concurrently executing a second thread for invoking a second one of the DSP hardware accelerator cores to perform a second DSP processing operation.

* * * * *